(12) United States Patent
Pellerin et al.

(10) Patent No.: US 7,143,890 B2
(45) Date of Patent: Dec. 5, 2006

(54) VERTICAL TRANSFER DEVICE FOR TIRE ASSEMBLY LINE

(75) Inventors: Dan Pellerin, Howell, MI (US); Chad A. Sinke, Hartland, MI (US); Brian Hoy, Brighton, MI (US)

(73) Assignee: Durr Systems, Inc., Plymouth, MI (US)

( * ) Notice: Subject to any disclaimer, the term of this patent is extended or adjusted under 35 U.S.C. 154(b) by 166 days.

(21) Appl. No.: 10/740,328

(22) Filed: Dec. 18, 2003
(Under 37 CFR 1.47)

(65) Prior Publication Data

US 2005/0056526 A1    Mar. 17, 2005

Related U.S. Application Data

(60) Provisional application No. 60/460,837, filed on Apr. 4, 2003.

(51) Int. Cl.
*B60C 25/00* (2006.01)
*B65G 47/24* (2006.01)
*B65G 47/86* (2006.01)
*B65G 47/252* (2006.01)

(52) U.S. Cl. .................. 198/373; 198/377.1; 198/379; 157/1; 157/1.1; 157/1.24

(58) Field of Classification Search ............ 157/1, 157/1.1, 1.24; 198/373, 377.07, 377.1, 379
See application file for complete search history.

(56) References Cited

U.S. PATENT DOCUMENTS

| | | | | |
|---|---|---|---|---|
| 1,850,053 A | * | 3/1932 | Stevens | 157/1.24 |
| 2,016,994 A | | 10/1935 | Fleming | 198/204 |
| 2,665,747 A | | 1/1954 | Harrison | 157/1.1 |
| 2,894,262 A | | 7/1959 | Schafroth | 1/13 |
| 2,907,379 A | * | 10/1959 | Tuttle | 157/1.1 |
| 3,656,343 A | * | 4/1972 | Braden et al. | 73/146 |
| 3,835,982 A | | 9/1974 | Zappia | 198/204 |
| 4,007,827 A | | 2/1977 | Mattos | 198/862 |
| 4,146,126 A | | 3/1979 | Mattos | 198/862 |
| 4,353,156 A | | 10/1982 | Rosaz | 29/221.5 |
| 4,420,026 A | * | 12/1983 | Goiseau | 157/1.24 |
| 4,573,859 A | | 3/1986 | Amano et al. | 414/628 |
| 4,621,671 A | * | 11/1986 | Kane et al. | 157/1.1 |
| 4,638,756 A | | 1/1987 | Collmann | 118/215 |
| 4,829,749 A | | 5/1989 | Hiyama et al. | 53/538 |
| 4,834,159 A | * | 5/1989 | Burger | 157/1 |
| 4,846,334 A | * | 7/1989 | Cargould | 198/346.2 |
| 4,890,717 A | * | 1/1990 | Kane | 198/403 |
| 4,951,809 A | | 8/1990 | Boothe et al. | 198/841 |

(Continued)

OTHER PUBLICATIONS

PCT/US2004/009048 International Search Report.

*Primary Examiner*—Gene O. Crawford
*Assistant Examiner*—Leslie A. Nicholson, III
(74) *Attorney, Agent, or Firm*—Howard & Howard Attorneys, P.C.

(57) ABSTRACT

A transfer device is provided for transferring tires from a tire conveyor line to a wheel conveyor line. The transfer device includes first and second surfaces rotatable with respect to one another. The first surface can receive tires from the tire conveyor line. A rotating device rotates the first surface to induce movement of the tire to the second surface. The second surface can receive the tire from the first surface and rotate toward the wheel conveyor to position the tire to engage the wheel.

6 Claims, 4 Drawing Sheets

U.S. PATENT DOCUMENTS

| | | | |
|---|---|---|---|
| 5,035,274 A | 7/1991 | Kinnick et al. | 157/1.1 |
| 5,094,284 A * | 3/1992 | Curcuri | 157/1.17 |
| 5,131,531 A | 7/1992 | Chambers | 198/860.2 |
| 5,141,040 A * | 8/1992 | Curcuri | 157/1.17 |
| 5,170,828 A * | 12/1992 | Curcuri | 157/1 |
| 5,303,463 A * | 4/1994 | Pollard | 29/705 |
| 5,341,911 A | 8/1994 | Gamberini et al. | 198/409 |
| 5,529,171 A | 6/1996 | Langenbeck | 198/860.1 |
| 5,603,148 A * | 2/1997 | Hjorth-Hansen | 29/33 R |
| 5,749,141 A | 5/1998 | Matsumoto | 29/714 |
| 5,876,501 A | 3/1999 | Doan | 118/679 |
| 5,940,960 A | 8/1999 | Doan | 29/714 |
| 6,026,552 A | 2/2000 | Matsumoto | 29/407.04 |
| 6,209,684 B1 * | 4/2001 | Kane et al. | 184/101 |
| 6,325,202 B1 | 12/2001 | Gaines | 198/583 |
| 6,478,143 B1 | 11/2002 | Enomoto | 198/838 |
| 6,481,083 B1 | 11/2002 | Lawson et al. | 29/407.04 |
| 6,510,942 B1 | 1/2003 | McTaggart et al. | 198/861.1 |
| 2003/0000812 A1 | 1/2003 | McTaggart et al. | 198/860.1 |
| 2003/0010608 A1 | 1/2003 | Jaynes | 198/860.1 |
| 2003/0051326 A1 | 3/2003 | Lawson et al. | 29/407.01 |

* cited by examiner

VERTICAL TRANSFER DEVICE FOR TIRE ASSEMBLY LINE

RELATED APPLICATIONS

This Application claims the benefit of the provisional patent application 60/460,837 for a VERTICAL TRANSFER DEVICE FOR TIRE ASSEMBLY LINE, filed on Apr. 4, 2003, which is hereby incorporated by reference in its entirety.

FIELD OF THE INVENTION

The invention relates to the assembly of tires to wheels and, more specifically, the invention relates to a device for transferring a tire from a tire conveyor line to a wheel conveyor line.

BACKGROUND OF THE INVENTION

Numerous assembly lines for mounting tires upon wheels are known in the prior art and are widely used today in the automotive industry. Generally, the assembly lines, known in the art, contain conveying means, such as conveyor belts or metal rollers making it possible to route the tires, wheels and mounted assemblies, respectively, from one point to another on the assembly line. The tires and wheels are delivered from a supply warehouse by means of suitable pallets to be further mounted on the assembly line and delivered to customers. The tires and wheels are typically treated by the lubrication solution before the tire is installed on the wheel.

Various automated equipment and systems have been previously recognized to use a loader assembly that facilitates the transfer of the tires from an upper conveyance device to a lower conveyance device. For example, one of these systems is shown in U.S. Pat. No. 6,209,684 to Kane et al. These automated systems have limited capabilities to monitor the diameter of the tire, thereby lacking ability to control the tires of different heights and prevent the tires from escaping beyond the loader area, thereby keeping the tires within the loader.

Accordingly, the opportunity remains for a new design of the loader having a device capable of adjusting the width of various tires, thereby keeping the tires within the loader on the factory's floor.

SUMMARY OF INVENTION

The present invention provides a transfer device for moving tires between a first conveyor line and a second conveyor line. The device includes a first surface for receiving tires from the first conveyor line. The device also includes a rotating device for rotating the first surface relative to the first conveyor line. A second surface of the device receives the tires from the first surface after the first surface is rotated. The device also includes a second rotating device for rotating the second surface toward the second conveyor. The second surface positions the tires to be received by a wheel moving along the second conveyor line.

One of the advantages of the present invention is that tires can be efficiently moved from the first conveyor line to the second conveyor line. In particular, the first surface retains a tire while a second tire is positioned by the second surface to engage a wheel moving along the second conveyor. As soon as the tire is received by the wheel, the first surface is rotated to move another tire into position on the second surface to engage a second wheel moving along the second conveyor. The second conveyor is rotated to precisely position the tires to engage one of a plurality of different configurations of wheels moving along the second conveyor.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
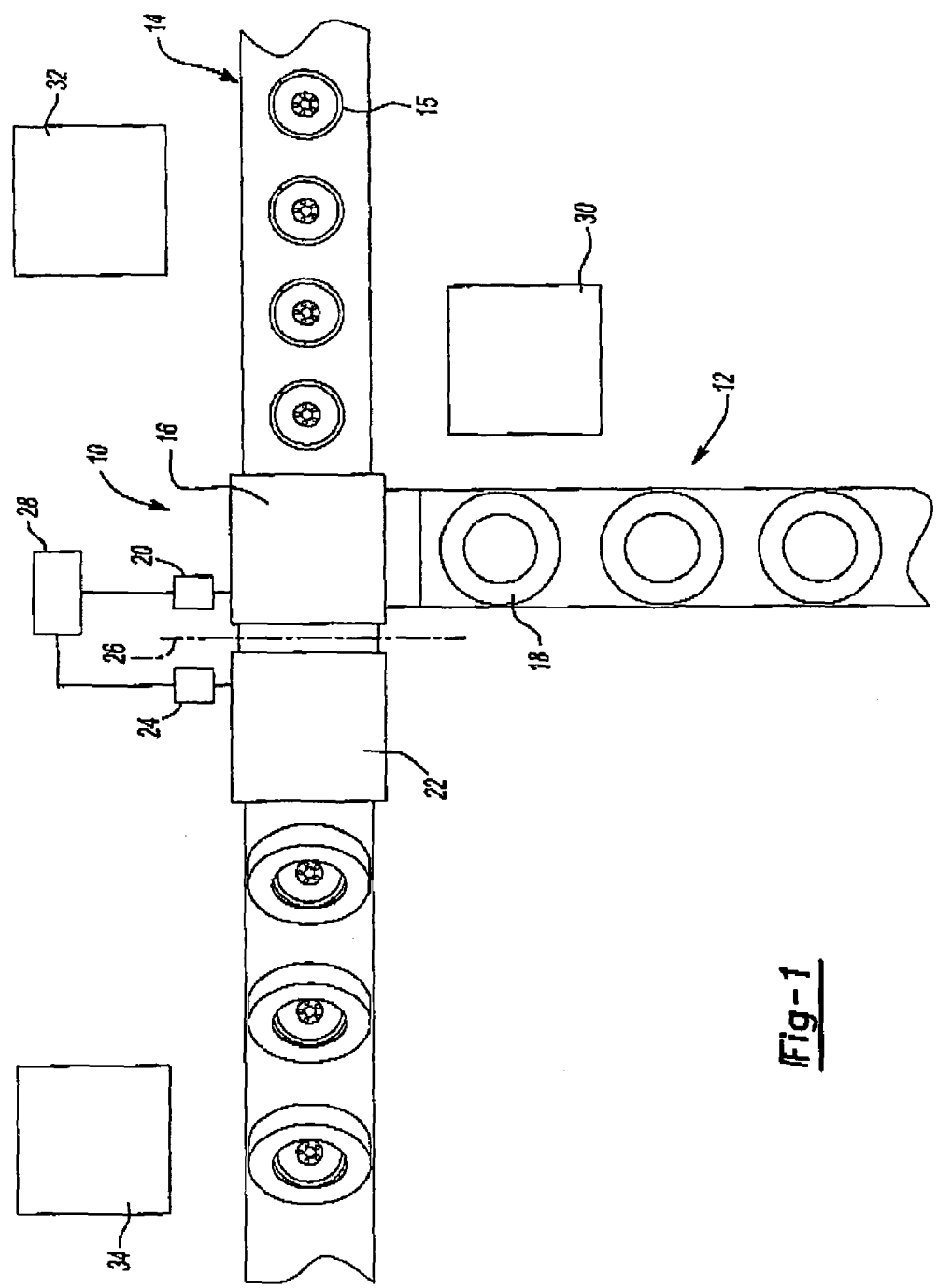
FIG. 1 is an overhead schematic view of the exemplary embodiment of the transfer device according to the present invention.

Referring now to FIG. 1, the present invention provides a transfer device 10 for moving tires including a first conveyor 12 for moving tires and a second conveyor 14 for moving wheels. The first conveyor 12 is positioned above the second conveyor 14. The device 10 also includes a first surface 16 for receiving a tire 18 from the first conveyor 12. A first rotating device 20 rotates the first surface 16 upwardly from the first conveyor 12 pivoting generally adjacent axis 26 in response to the first surface 16 receiving the tire 18. The tire 18 moves from the first surface 16 when the first surface 16 is rotated upwardly by the first rotating device 20 and is received by a second surface 22. A second rotating device 24 rotates the second surface 22 towards the second conveyor 14 by pivoting the second surface adjacent axis 26 in response to the second surface 22 receiving the tire 18 from the first surface 16. Therefore, the surfaces 16, 22 are rotated about a common axis 26 as will be explained further below.

A controller 28 controls the first and second rotating devices 20, 24 independently of one another to enhance the efficiency of the movement of the tires from the first conveyor 12 to the second conveyor 14. For example, the first surface 16 retains a first tire 18a while the second surface 22 positions a second tire 18b for engagement with a wheel 15 moving along with the second conveyor 14. As soon as the second tire 18 engages the wheel 15 and is removed from the second surface 22, the rotating device 20 quickly rotates the first surface 16 upwardly to move the first tire 18a to the second surface 22. Once the first tire 18a is received by the second surface 22, the first surface 16 is rotated back into alignment with the first conveyor 12 to receive another tire 18 from the first conveyor 12.

The device 10 also includes a tire soaper device 30 positioned along the first conveyor 12 and a wheel soaper device 32 positioned along the second conveyor 14. The respective soaped tires 18 and soaped wheels 15 are joined along the second conveyor 14 adjacent the second surface 22 and move along the conveyor 14 to a tire assembly and inflation station 34. Other workstations, such as valve stem insertion station or a tire inflation testing workstation, can be disposed upstream or downstream of the transfer device 10 as required.

Figure 2:
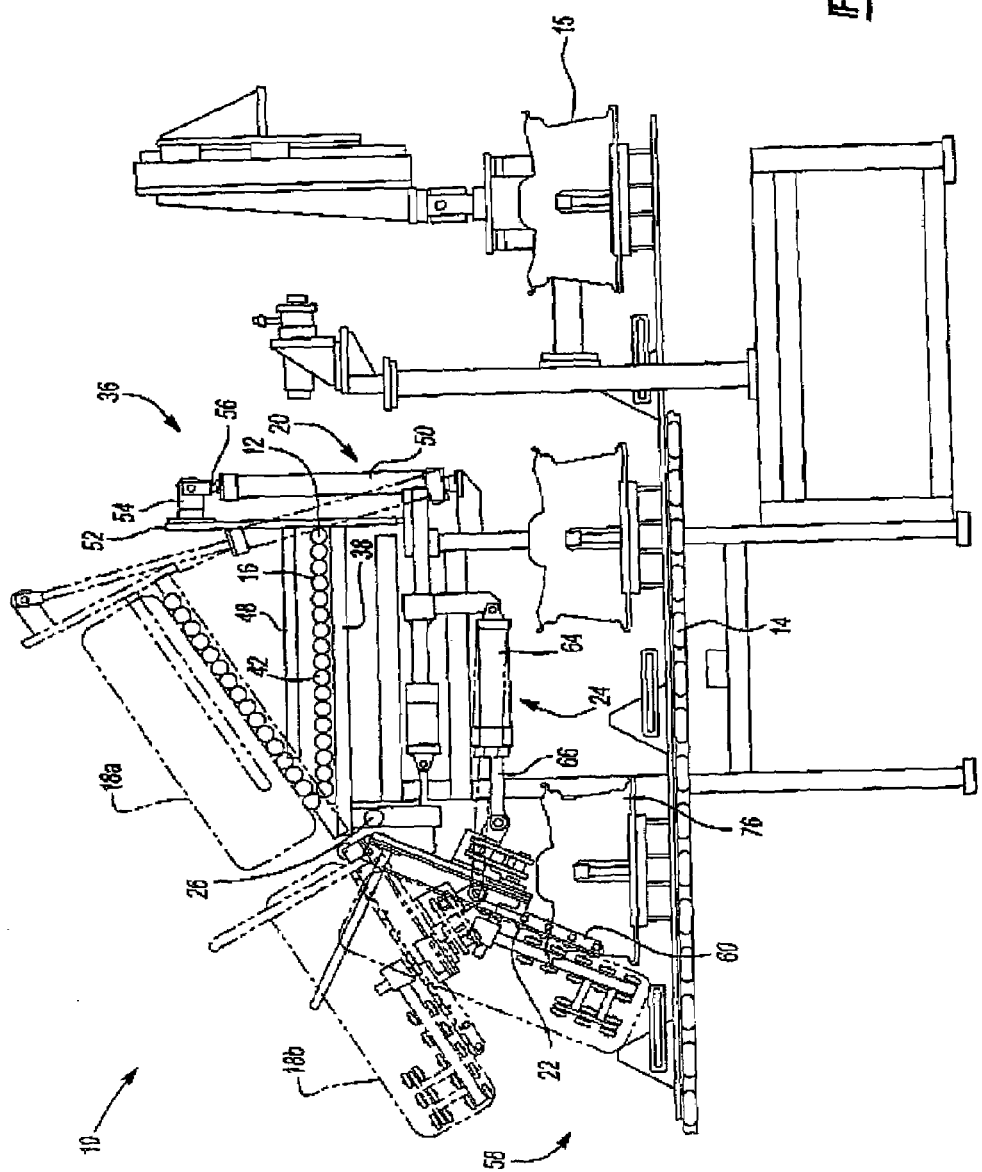
FIG. 2 is a detailed side view of the transfer device.
Figure 3:
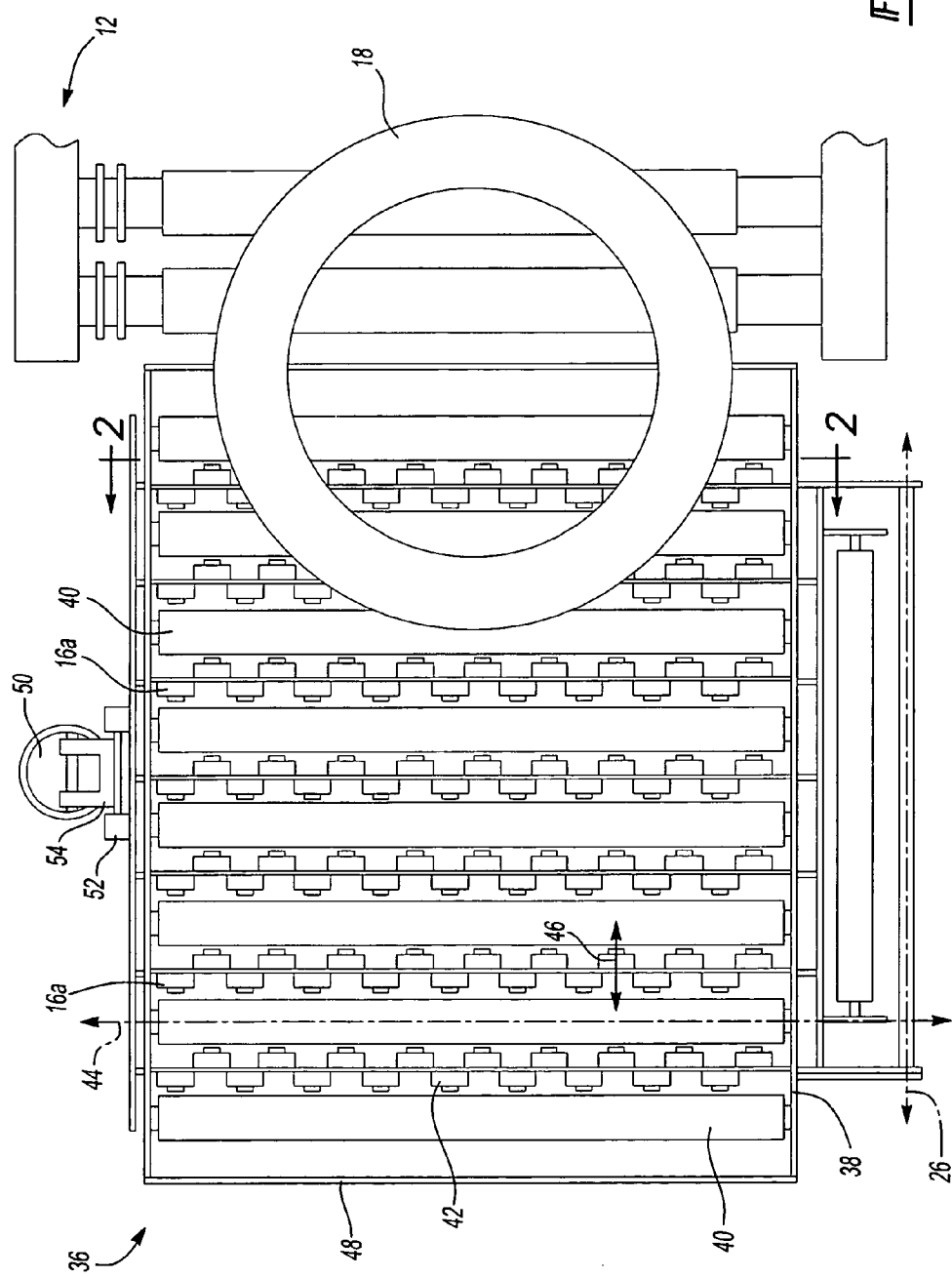
FIG. 3 is a top view of a portion of the transfer device defining a first surface.

Referring now to FIGS. 2 and 3, the device 10 according to a more detailed embodiment of the invention includes a first portion 36 defining the first surface 16. The first portion 36 includes a frame 38 supporting a plurality of first rollers 40 (FIG. 3) and a plurality of second rollers 42. The first rollers 40 extend the width of the frame 38 and rotate about an axis transverse to the first conveyor 12, such as axis 44. Each of the plurality of second rollers 42 rotate about an axis that is parallel to the conveyor 12, such as axis 46. The outer surfaces of the rollers 40, 42 define the first surface 16 and facilitate movement of the tire 18 from the first conveyor 12.

The first portion 36 is rotatable about the axis 26. As shown best in FIG. 2, the first portion 36 is rotatable between a first position (shown in solid line) and a second position (shown in phantom). In the first position, the first surface 16 is substantially horizontal and aligned with the conveyor 12 to receive the tire 18. In the second position, the first surface 16 is rotated about the axis 26 and the tire 18 slides to the second surface 22. During movement of the tire 18 from the conveyor 12 to the surface first 16, the tire 18 is supported for movement by the rollers 40. During movement of the tire 18 from the first surface 16 to the second surface 22, the tire 18 is supported for movement by the rollers 42. A guide member 48 guides the tire 18 during movement between the first and second surfaces, 16, 22 by preventing the tire 18 from sliding off the first surface 16.

As best shown in FIG. 2, the device 10 includes a first rotating device 20 for rotating the first surface 16. The first rotating device 20 includes cylinder 50 connected to a member 52 of the portion 36 by a bracket 54. The cylinder 50 includes a rod 56. Extension of the rod 56 from the cylinder 50 moves the surface 16 from the first position to the second position. Retraction of the rod 56 from the cylinder 50 moves the surface 16 from the second position to the first position. The cylinder 50 can be a pneumatic cylinder or a hydraulic cylinder. Alternatively, the rotating device 20 can include electric servomotor and a ball screw.

Figure 4:
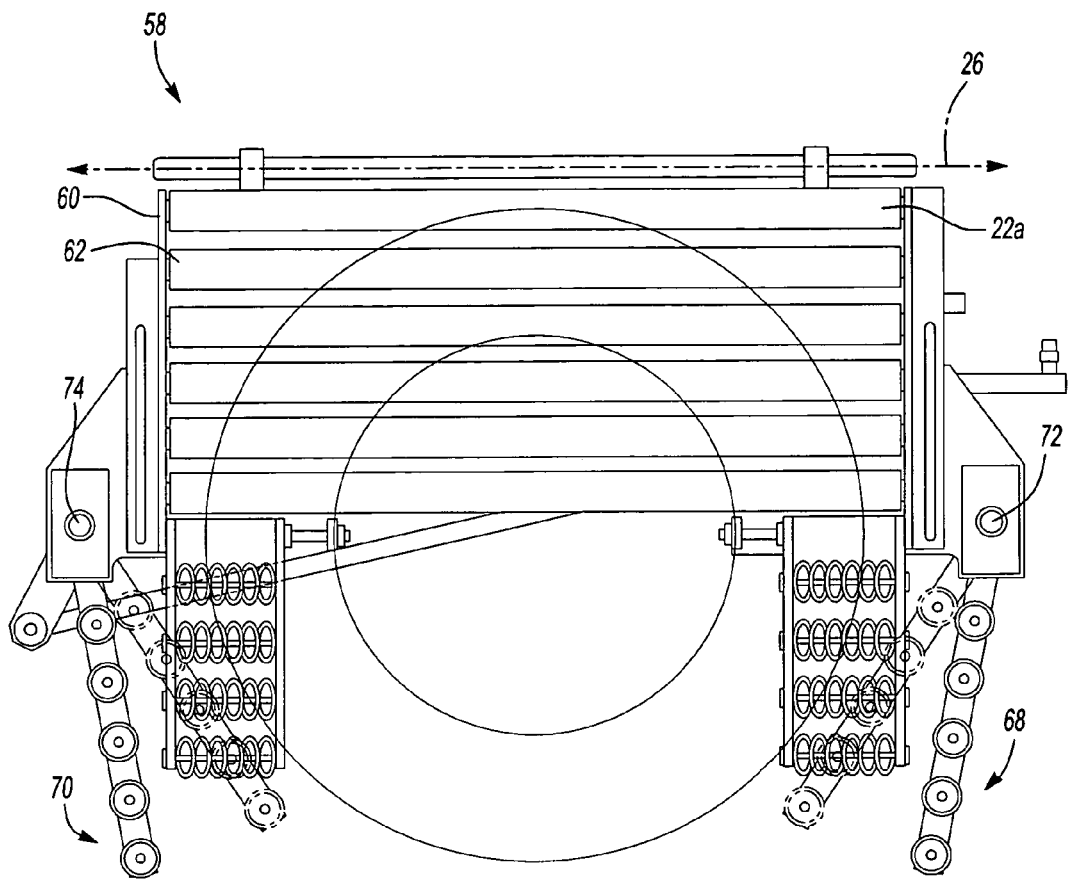
FIG. 4 is a top view showing a portion of the transfer device defining a second surface.

Referring now to FIGS. 2 and 4, the device 10 also includes a second portion 58 defining the second surface 22. The second portion 58 includes a frame 60 and a plurality of rollers 62. The second portion 58 is rotatable about the axis 26 by the second rotating device 24. The rotating device 24 includes a cylinder 64 having a rod 66. Extension of the rod 66 from the cylinder 64 moves the portion 58 to a first position (shown in phantom). As shown in FIG. 2, the first position of the second portion 58 is substantially aligned with the second position of the first portion 36. The second portion 58 receives the tire 18 from the first portion 36 while in the first position and is rotated about the axis 26 to the second position (shown in solid line) to deliver the tire 18b to the wheel 76. The extension of the rod 66 moves the second portion 58 to the first position and retraction of the rod 66 moves the second portion 58 to the second position.

As best seen in FIG. 4, the second portion 58 includes first and second arms 68, 70 for controlling movement of the tire 18. Specifically, the arm 68 rotates about an axis 72 and the arm 70 rotates about an axis 74. The arms 68, 70 are rotated toward one another to maintain the position of the tire 18 during engagement with a wheel 76. The arms 68, 70 rotate away from one another to release the tire 18b after the tire has engaged the wheel 76. As shown in FIG. 2, the wheel 76 moves along the second conveyor 14 and engages the tire 18b when the second portion 58 is located in the second position.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility. In addition, the reference numerals in the claims are merely for convenience and are not to be read in any way as limiting.

What is claimed is:

1. A method for moving tires comprising the steps of:
 moving tires along a first conveyor;
 moving wheels along a second conveyor;
 receiving a tire from said first conveyor with a first surface;
 rotating said first surface away from said first conveyor in response to said first surface receiving the tire with a first rotating device;
 receiving the tire from said first surface in response to rotation of said first surface with a second surface;
 rotating said second surface toward said second conveyor in response to said second surface receiving the tire from said first surface with a second rotating device; and
 pivoting said first and second surfaces around a common axis to transfer the tires from said first surface to said second surface as said first surface extends above said first conveyor.

2. The method of claim 1 including extending said first and second conveyors transverse with respect to one another.

3. The method of claim 1 including rotating said first and second surfaces independently of one another.

4. The method of claim 1 including delivering the tire to the wheel.

5. The method of claim 1 including releasing the tire from said second surface.

6. The method of claim 1 removing the tire from said second surface by indexing said conveyor.

* * * * *